(12) United States Patent
Mountcastle

(10) Patent No.: US 7,170,862 B1
(45) Date of Patent: Jan. 30, 2007

(54) PARTITIONING A NETWORK ELEMENT INTO MULTIPLE VIRTUAL NETWORK ELEMENTS

(75) Inventor: Sean Mountcastle, Herndon, VA (US)

(73) Assignee: Cisco Technology, Inc., San Jose, CA (US)

( * ) Notice: Subject to any disclaimer, the term of this patent is extended or adjusted under 35 U.S.C. 154(b) by 815 days.

(21) Appl. No.: 09/920,268

(22) Filed: Jul. 31, 2001

(51) Int. Cl.
  *H04L 12/28* (2006.01)
  *G06F 15/173* (2006.01)

(52) U.S. Cl. .............. 370/254; 370/400; 370/462; 709/226

(58) Field of Classification Search .......... 370/254, 370/351, 400, 223, 224; 709/223, 224, 225, 709/226
See application file for complete search history.

(56) References Cited

U.S. PATENT DOCUMENTS

| | | | | |
|---|---|---|---|---|
| 4,843,541 A | * | 6/1989 | Bean et al. ................... 710/36 |
| 5,299,207 A | | 3/1994 | Fujii | |
| 5,335,229 A | | 8/1994 | Hunt et al. | |
| 5,530,860 A | * | 6/1996 | Matsuura ................... 718/105 |
| 5,550,816 A | * | 8/1996 | Hardwick et al. .......... 370/397 |
| 5,579,384 A | | 11/1996 | Seymour ................... 379/243 |
| 5,845,062 A | | 12/1998 | Branton, Jr. et al. | |
| 6,122,362 A | * | 9/2000 | Smith et al. ................ 379/230 |
| 6,198,725 B1 | | 3/2001 | Constantin et al. ......... 370/231 |
| 6,385,638 B1 | * | 5/2002 | Baker-Harvey ............ 718/107 |
| 6,430,592 B1 | * | 8/2002 | Davison .................... 718/103 |
| 6,434,612 B1 | * | 8/2002 | Hughes et al. ............. 709/223 |
| 6,438,704 B1 | * | 8/2002 | Harris et al. ................ 713/502 |
| 6,587,938 B1 | * | 7/2003 | Eilert et al. ................. 712/29 |
| 6,674,756 B1 | * | 1/2004 | Rao et al. ............. 370/395.21 |
| 6,691,146 B1 | * | 2/2004 | Armstrong et al. ......... 718/100 |
| 6,763,192 B1 | * | 7/2004 | Jagannathan ................ 398/54 |
| 2002/0085545 A1 | * | 7/2002 | Ku et al. .................... 370/369 |
| 2002/0156824 A1 | * | 10/2002 | Armstrong et al. ......... 709/104 |
| 2003/0051048 A1 | * | 3/2003 | Watson et al. .............. 709/238 |

* cited by examiner

*Primary Examiner*—Hassan Kizou
*Assistant Examiner*—Brian Roberts
(74) *Attorney, Agent, or Firm*—Cindy Kaplan

(57) ABSTRACT

Techniques for partitioning a network element into multiple virtual network elements are provided. Resources of the network element are allocated to the virtual network elements and a virtual network element manager manages the execution of the virtual network elements. The virtual network elements allow the network element to conceptually function and be customized as distinct network elements.

18 Claims, 16 Drawing Sheets

PARTITIONING A NETWORK ELEMENT INTO MULTIPLE VIRTUAL NETWORK ELEMENTS

BACKGROUND OF THE INVENTION

The present invention relates to network elements for networks. More specifically, the invention relates to partitioning a single physical network element into multiple virtual network elements.

As communication networks have been evolving, there has been a significant increase in the transmitted bandwidth and the number of communication protocols. Each network element (or device) is responsible for, among other things, receiving data on a media and transmitting the data on another media. Typically, a network element transmits data between other network elements until the data reaches its destination.

An exemplary network element includes multiple ports for transmitting and receiving data, a processor and memory (both for temporarily storing data communicated over the network and for storing computer programs executed by the processor). The computer programs executing on the network element direct to the operation of the network element and may be periodically updated by the manufacturer of the network element.

Although the computer programs on a network element may be updated for many number of reasons, possibly the two most common are to fix bugs and enhance features, including the utilization of new communication protocols.

In general, the computer program that dictates the operation of the network element address the operation of the network element as a whole. Although some network elements execute multiple copies of the computer programs for fault tolerant purposes, each of the copies of the computer programs direct the operation of the network element as a whole.

One of the problems with computer programs that direct the operation of the network element as a whole is that it is more difficult to customize the operation of the network element. Some customization may be available in the software provided by the manufacturer, but the customization will be limited to the customization that the manufacturer anticipated would be requested and decided to implement. If the desired customization is not available, a user may attempt to contact the manufacturer and have the desired customization implemented in an update. However, this process will likely be slow and produce unsatisfactory results.

Therefore, what is needed are innovative methods of providing customization for network elements. Additionally, it would be beneficial to provided methods that allow a network element to be customized for multiple users.

SUMMARY OF THE INVENTION

The present invention provides innovative techniques for partitioning a network element into multiple virtual network elements. In general, a virtual network element (or VNE) performs the functions of a network element but utilizes a subset of the resources of the network element. In other words, the network element can be partitioned into multiple virtual network elements, where each virtual network element can be individually customized. In this manner, a network element can be readily customized for multiple users or a single user can customize the virtual network elements as desired. Some specific embodiments of the invention are described below.

In one embodiment, the invention provides a method of partitioning a network element into multiple virtual network elements. A virtual network element manager is provided that manages a resource (or resources) of the network element. A portion of the resource(s) of the network element is allocated to one of the multiple virtual network elements. The virtual network element is permitted to utilize only the portion of the resource(s) of the network element that has been allocated to it.

In another embodiment, the invention provides a network element. The network element includes a resource and a virtual network element manager that manages the resource of the network element. The network element also includes a virtual network element that is allocated a portion of the resource of the network element and is permitted to utilize only the portion of the resource of the network element that has been allocated to the virtual network element.

In another embodiment, the invention provides a method of partitioning a network element into multiple virtual network elements. A virtual network element manager is provided that manages resources including processor time, memory and ports of the network element. A portion of each of the resources of the network element is allocated to each of the multiple virtual network elements. Each of the multiple virtual network elements are permitted to utilize only the portions of the resources of the network element that have been allocated to each of the multiple virtual network elements.

In another embodiment, the invention provides a network element that transmits data in a network. The network element includes resources including processor time, memory and ports of the network element. Additionally, the network element includes a virtual network element manager that manages the resources of the network element. Multiple virtual network elements are each allocated portions of the resources of the network element and are permitted to utilize only the portions of the resources of the network element that have been allocated to each of the virtual network elements.

In another embodiment, the invention provides a method of partitioning a network element that transmits data in a network into multiple virtual network elements. Input is received as to a portion of at least one resource of the network element to allocate to one of the multiple virtual network elements. The portion of the network element is allocated to the virtual network element and the virtual network elements is permitted to utilize only the portion of the at least one resource of the network element that has been allocated to the virtual network element.

Other features and advantages of the invention will become readily apparent upon review of the following description in association with the accompanying drawings, where the same or similar structures are designated with the same reference numerals.

3B shows an example of a graphical user interface window for verifying or changing the configuration of a virtual network element.

FIGS. 4A–4G show examples of graphical user interface windows for initializing and managing two virtual network elements.

Figure 5:
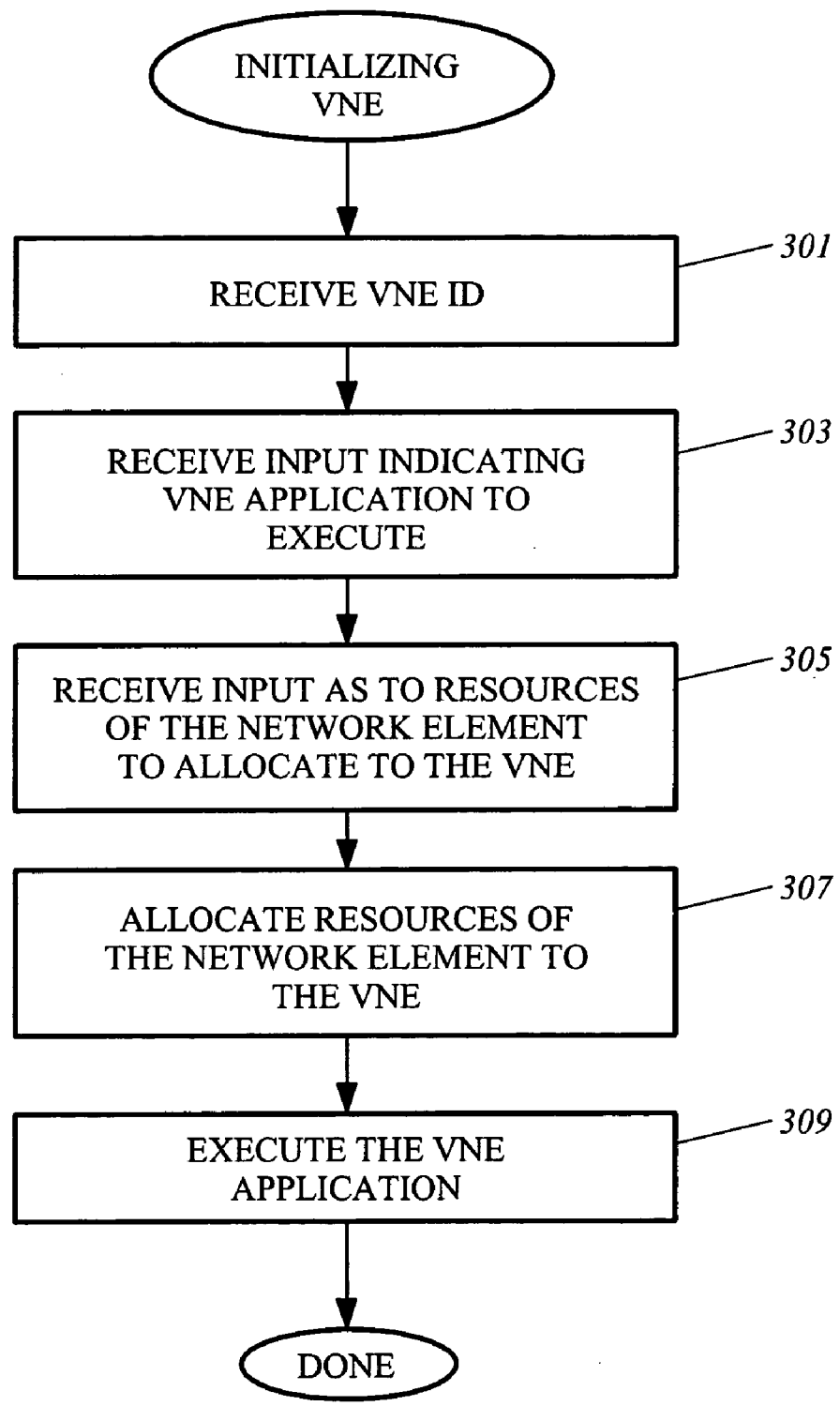

FIG. 5 shows a flowchart of a process of initializing a virtual network element.

Figure 6:
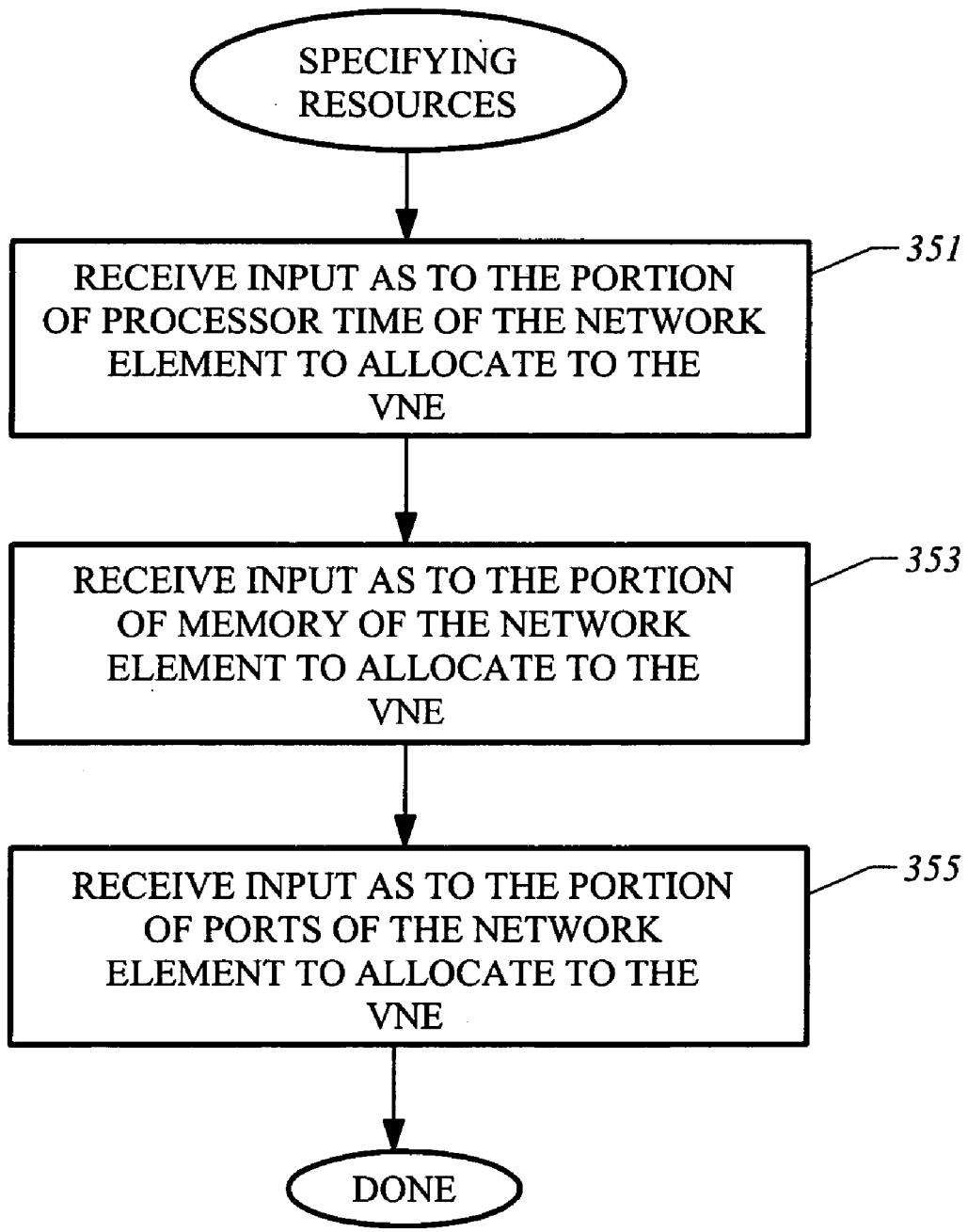

FIG. 6 shows a flowchart of a process of specifying resources including processor time, memory and/or ports for the virtual network element to utilize.

Figure 7:
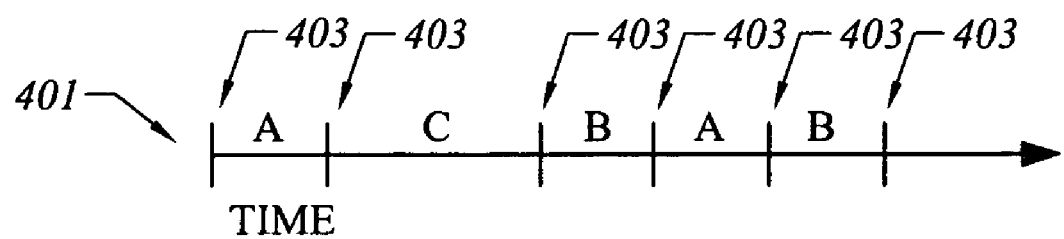

FIG. 7 shows a timeline to illustrate how the processor time of the network element can be shared by multiple virtual network elements.

Figure 8:
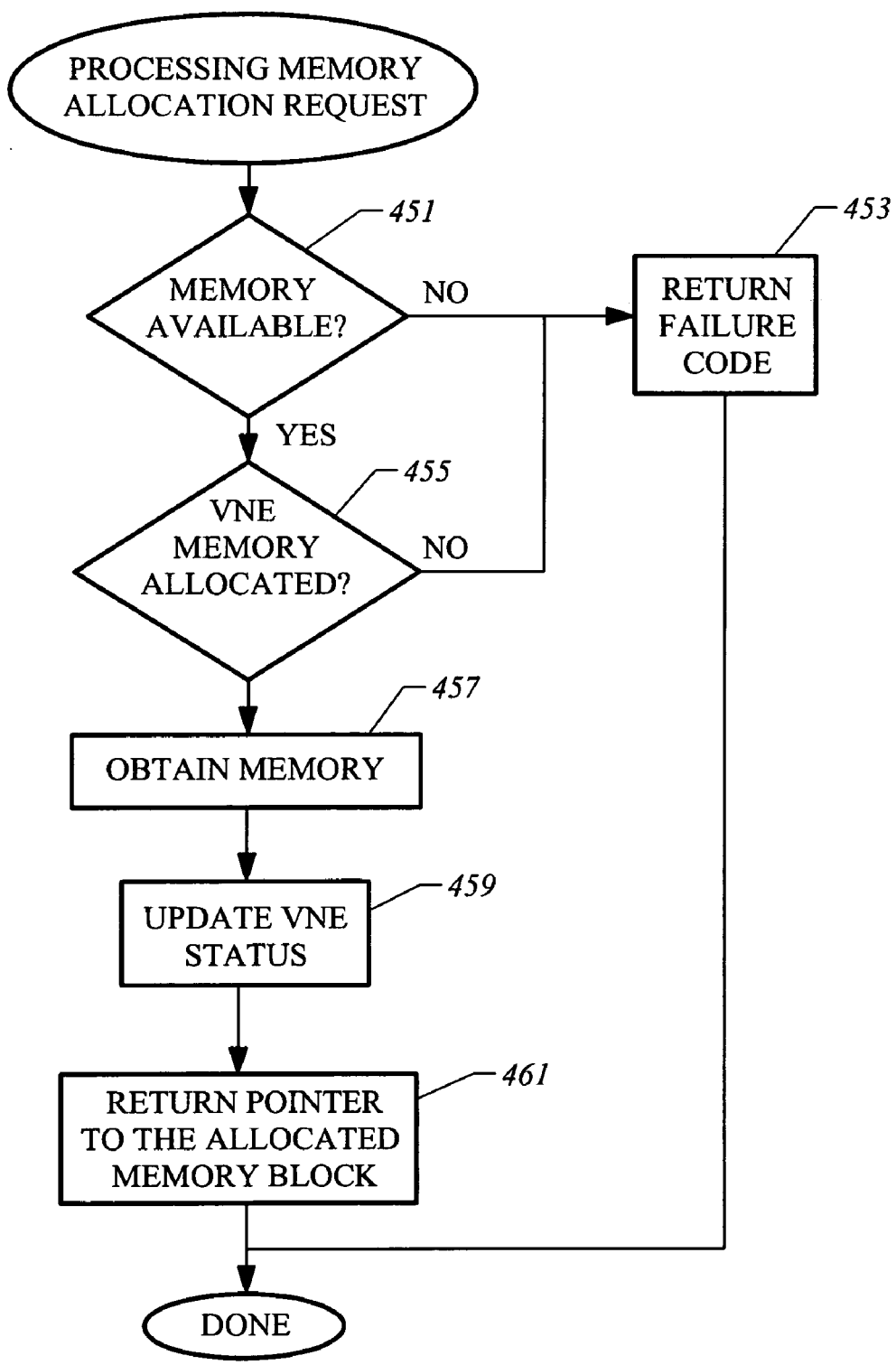

FIG. 8 shows a flowchart of a process that the virtual network element manager can execute to process a memory allocation request from a virtual network element manager.

Figure 9:
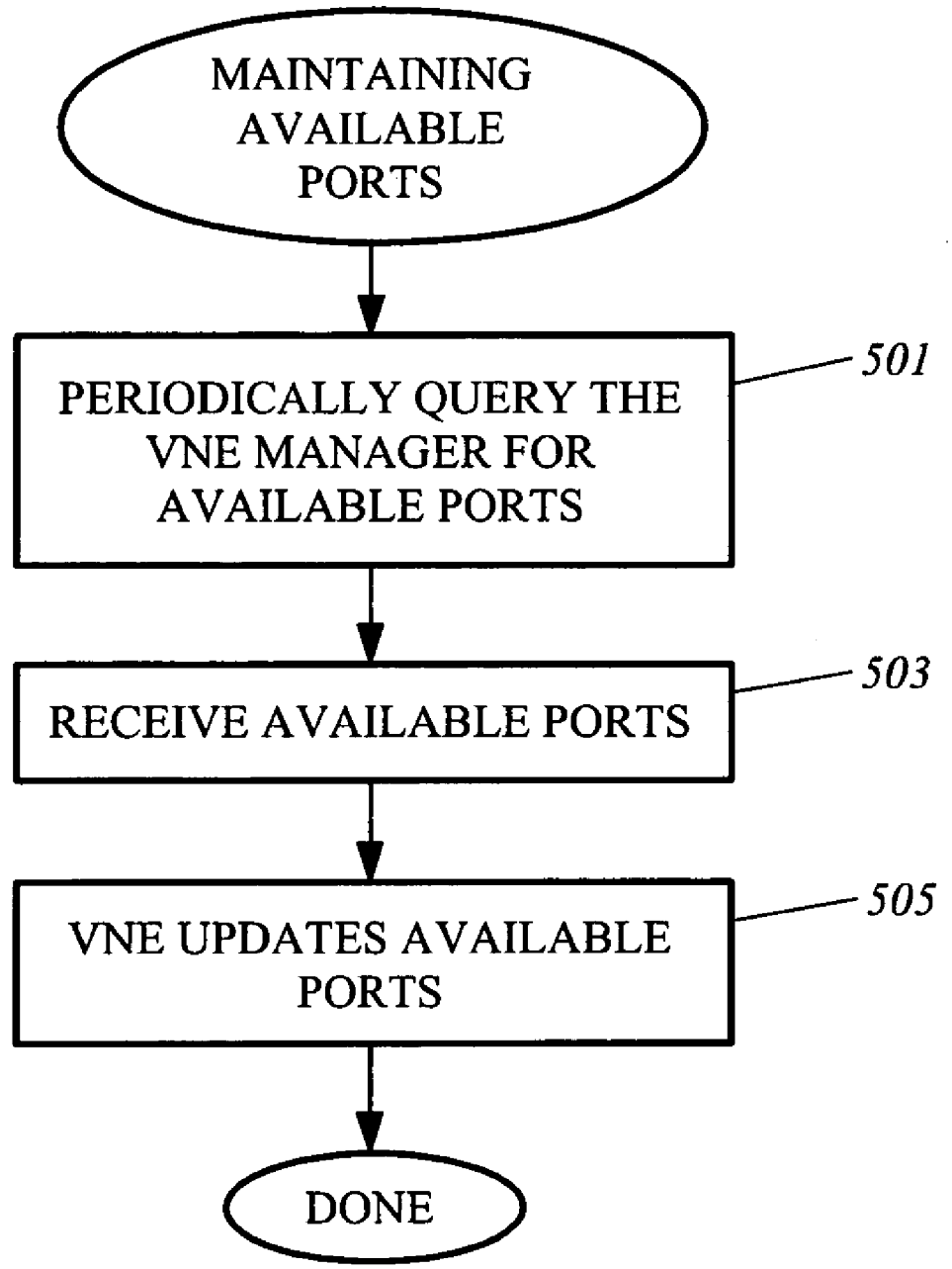

FIG. 9 shows a flowchart of a process a virtual network element can utilize to maintain available ports of the network element.

DETAILED DESCRIPTION OF PREFERRED EMBODIMENTS

In the description that follows, the present invention will be described in reference to embodiments that partition a switch into multiple virtual switches. However, embodiments to the invention are not limited to any particular environment, application or implementation. For example, the invention may be advantageously applied to other network elements including switches, routers, hubs, cross-connects, multiplexors (including Dense Wave Division Multiplexing or DWDM, Synchronized Optical Networks or SONET and Sychronized Digital Hierarchy or SDH), Storage Area Networks (SAN), and the like. Therefore, the description of the embodiments that follows is for purposes of illustration and not limitation.

Figure 1:
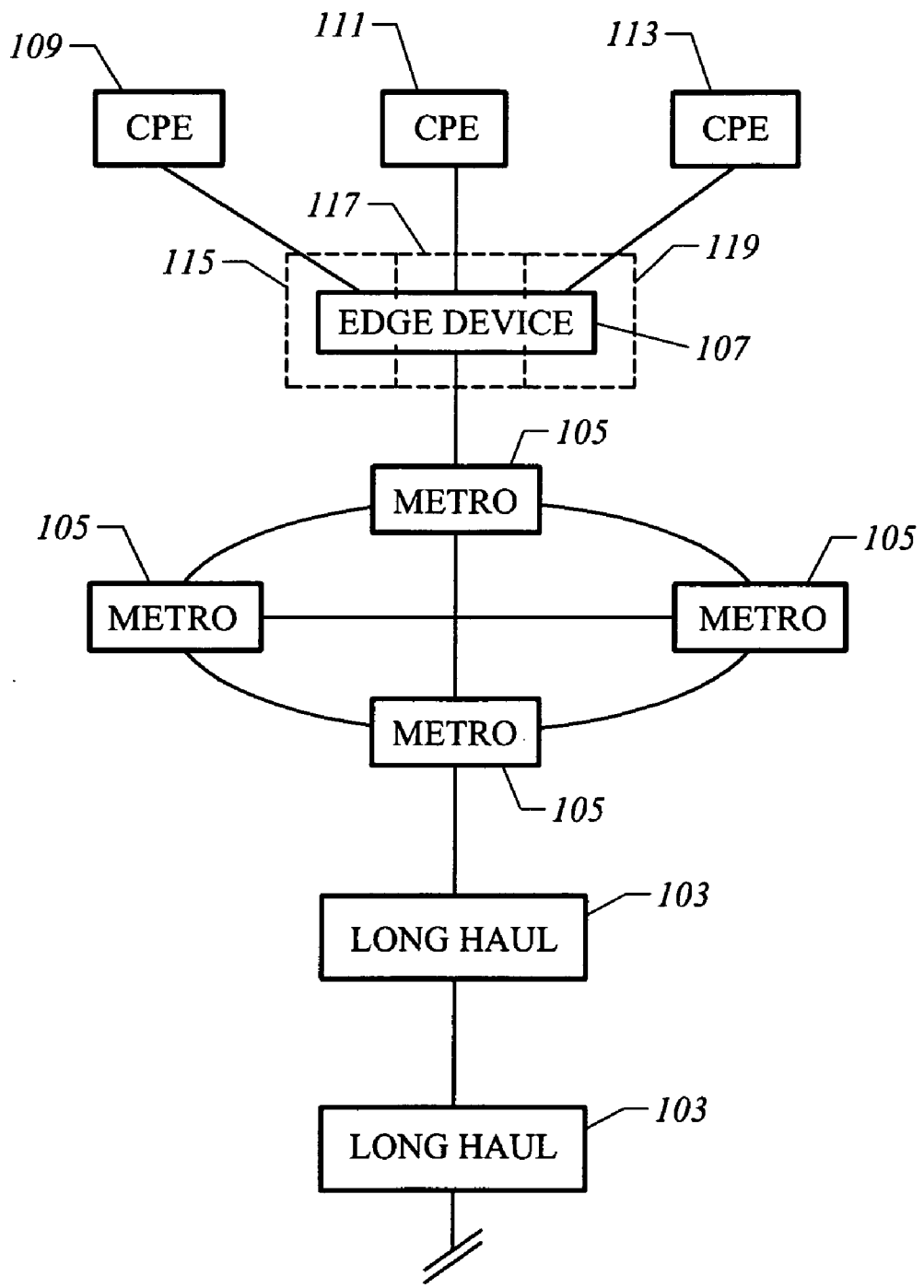
FIG. 1 shows an example of a network including multiple network elements and a network element that is partitioned into multiple virtual network elements.

FIG. 1 shows an example of a network including multiple network elements. The network shown is intended to illustrate exemplary network elements that can utilize embodiments of the invention. However, the network does not show all the network elements that can benefit from the invention nor does it show a complete network, such as the wide area network of the Internet, to which the invention can be advantageously applied.

Network data can be communicated over long distances utilizing long haul network elements 103. As an example, long haul network elements 103 can utilize DWDM and can operate at terabit per second speeds. Within a metropolitan area, metro network elements 105 can transmit network data within a ring, such as a SONET ring. An example of a metro element 105 is the Cisco ONS 15454 available from Cisco Systems, Inc., San Jose, Calif.

An edge device (such as a switch) 107 transmits network data to and from customer premise equipment (CPE) 109, 111 and 113. Edge device 107 is a network element that, among other things, receives network data for one of the customer premise equipment 109, 111 and 113, and routes the network data to the appropriate destination. An example of edge device 107 is the Cisco ONS 15327 available from Cisco Systems, Inc., San Jose, Calif.

Conceptually, it may be beneficial to think of metro network elements 105 as transmitting network data in a metropolitan area. The long haul network elements 103 transmit network data between metropolitan areas. Edge device 107 is maintained by a service provider to send and receive network data to different customer sites that have their own customer premise equipment 109, 111 and 113. Although this network description is fairly common, embodiments of the invention are not limited to the network as has been described.

Typically, the service provider purchases edge device 107 from a manufacturer. Although the manufacturer may allow the service provider to customize edge device 107 to some degree, the customers may desire more customization than is provided. Additionally, the customers may be required to go through the service provider in order to customize edge device 107 for their needs.

With an embodiment of the invention, edge device 107 is partitioned into multiple virtual network elements 115, 117 and 119. The virtual network elements can be thought of as independent network elements since they are fully customizable, subject to the resources of edge device 107 and any limitations established by the service provider.

Many of the resources of the network element that is partitioned into multiple virtual network elements will be shared. As an example, shared resources can include any one or more of the processor time, memory and ports. With an embodiment of the invention, the service provider can establish multiple levels of service to be provided to customers by their virtual network elements. For example, a lower level of service may grant a network element a reduced amount of processor time, memory and/or ports in which to provide network data to the customer. A middle level of services may provide more resources and the highest level of service may provide the highest level of resources that are available. Although three levels of service have been described, any number of levels can be implemented.

Additionally, a service provider can offer levels of service that include resources that customers will likely desire. For example, one level of service may include a higher amount of memory for storing network data while another level of service may include increased bandwidth via the aggregation of multiple ports. By offering different levels of service to customers, the service provider can easily change the level of service that a customer is receiving from a virtual network element.

In other embodiments, the service provider can provide the specifications for the virtual network element to customers or other vendors so that custom virtual network elements can be designed and sold. Therefore, the generation of virtual network elements is not limited to the service providers.

The virtual network elements have been described in reference to edge device 107, however, all the network elements can be partitioned into multiple network elements. For example, if all the network elements between two locations on the network are partitioned into virtual network elements, a service provider could guarantee a specific level of service between the two locations. As another example, the customer premise equipment may include a network at a university. The university may have a network that is utilized for the operation of the university and include another network (or multiple networks) that is being utilized for research purposes. By creating a virtual network element for the university network and another virtual network element for the research network, the virtual network element for the research network can be customized as desired without affecting the university network.

Figure 2:
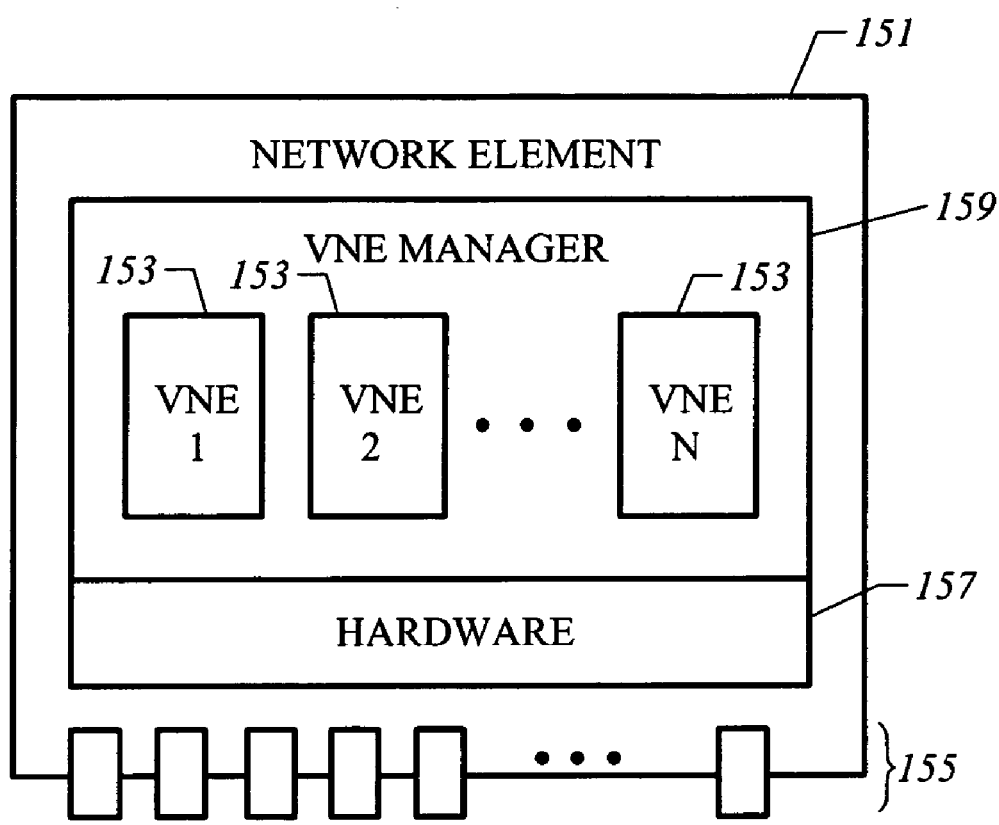
FIG. 2 shows a block diagram of a network element including a virtual network element manager that manages multiple virtual network elements.

Now that exemplary networks and applications for virtual network elements have been described, it may be beneficial to describe the partitioning of a network element in more detail. FIG. 2 shows a block diagram of a network element 151 that is partitioned into multiple virtual network elements 153. As shown, network element 151 includes ports 155 through which network data is transmitted and received.

Network element 151 includes hardware 157, such as a processor, memory and switch fabric. A virtual network element manager 159 manages the execution of virtual network elements 153. Virtual network element manager 159 can perform many of the functions of an operating system including managing the resources that are available to virtual network elements 153. As will be described in more detail below, virtual network element manager 159 can perform time slicing of the processor time for the virtual network elements, allocating memory and allocation/verification of port usage.

Figure 3A:
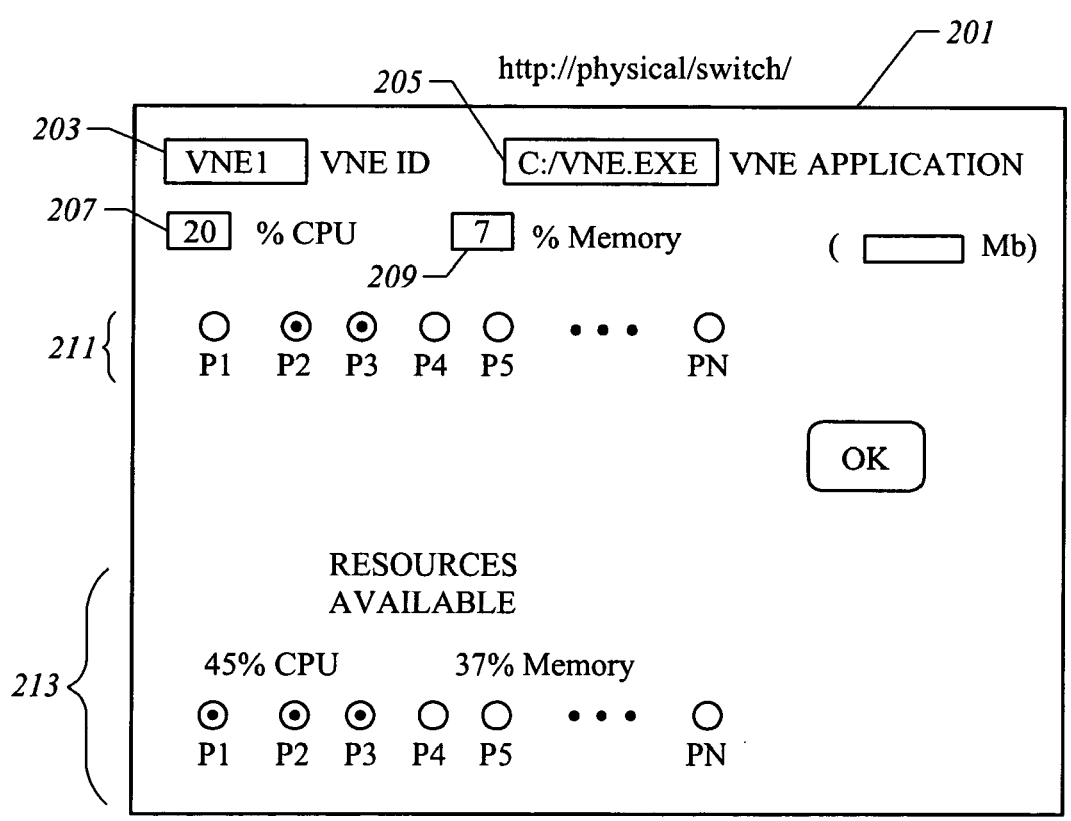
FIG. 3A shows an example of a graphical user interface window for initializing a virtual network element and FIG.

In one embodiment, virtual network element manager 159 maintains an HyperText Transfer Protocol (HTTP) daemon for initializing and configuring virtual network elements 153 through web pages. FIG. 3A shows an example of a graphical user interface window 201 of a web page that can be utilized to initialize a virtual network element. The user can specify the ID of the virtual network element in a text block 203. The virtual network element ID will be utilized to identify the virtual network element that is initialized.

The location of the binary executable of the virtual network element application can be specified in a text block 205. For example, if the service provider allows for different levels of service, the virtual network element application that is specified can correspond to the desired level of service. As will be described in more detail below, the binary executable is run to start the operation of the virtual network element.

A text block 207 can be utilized to specify the percentage of processor time that the virtual network element can utilize. A text block 209 can be utilized to specify the percentage of memory of the network element that can be utilized by the virtual network element. As shown, the amount of memory resources that are available can alternatively be specified in terms of memory size. Radio buttons 211 can be utilized to specify the ports that are available for use by the virtual network element. Although the examples shown in FIG. 3A includes resources of processor time, memory and ports, other embodiments can utilize fewer or additional resources.

In order to aid the user in initializing the virtual network element, a section 213 shows the resources that are currently available for use on the network element. As is shown in the top section of FIG. 3A, the user has specified resources for the virtual network element that are shown to be currently available on the network element in section 213.

Figure 3B:
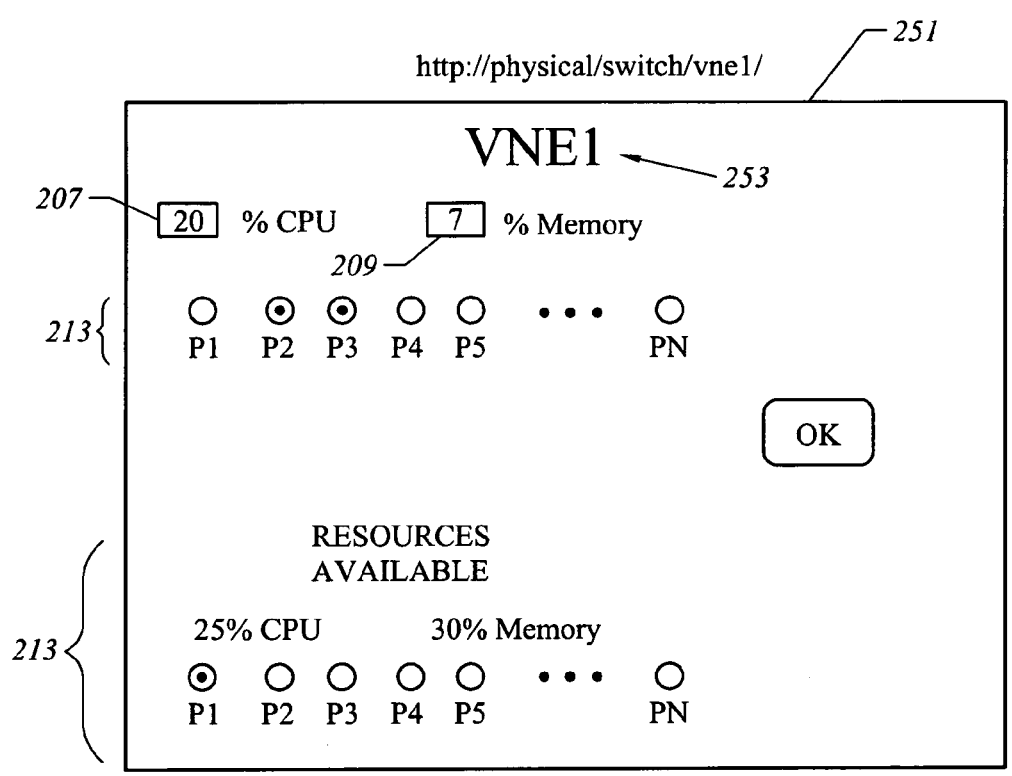

The information entered in window 201 can be utilized to initialize a virtual network element. Additionally, a web page can be created for configuring the virtual network element. FIG. 3B shows a window 251 of a web page that can be utilized to configure the virtual network element initialized in FIG. 3A. Title 253 shows the virtual network element ID that was specified by the user for the virtual network element. Text blocks 207 and 209, and radio buttons 213 can be utilized to configure the processor time, memory and ports that are available for the virtual network element as described above. Once the user has changed any of the values, the virtual network element manager allows the virtual network element to utilize the amount of resources specified.

Section 213 shows the resources that are currently available for use by virtual network elements on the network element. It should be noted that the resources available in FIG. 3B have been decreased according to the virtual network element that was initialized in FIG. 3A.

FIGS. 4A–4G show examples of graphical user interface windows for initializing and managing two virtual network elements in another embodiment. Initially in FIG. 4A, a graphical user interface window 255 shows the resource utilization by zero virtual network elements. A bar 257 shows that 0% of the memory of the network element is allocated and a bar 259 shows that 0% of the central processor unit (CPU) time is allocated. Scroll area 261 shows the status of the ports of the network element. As shown, none of the ports have been allocated to virtual network elements.

Figure 4A:
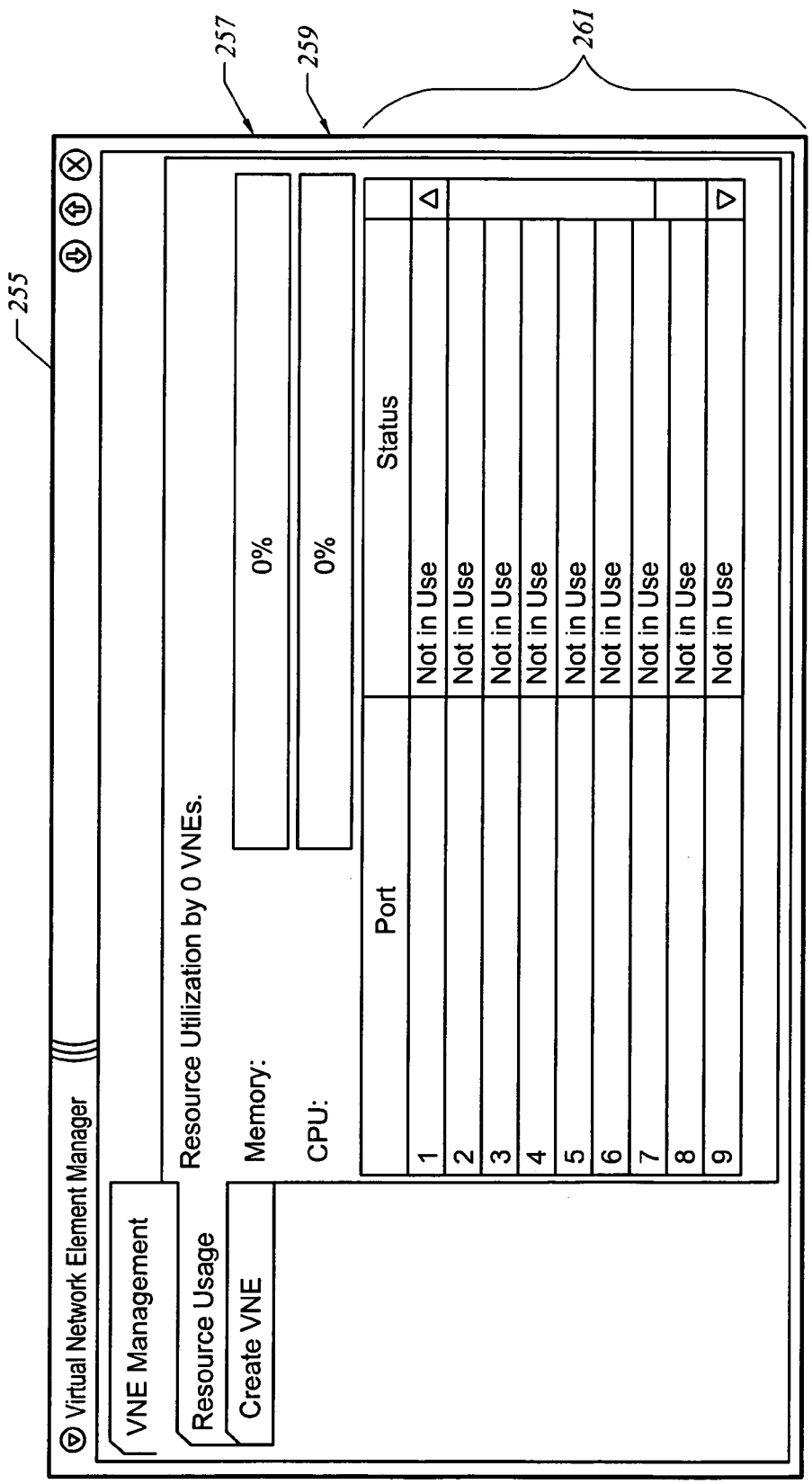
Figure 4B:
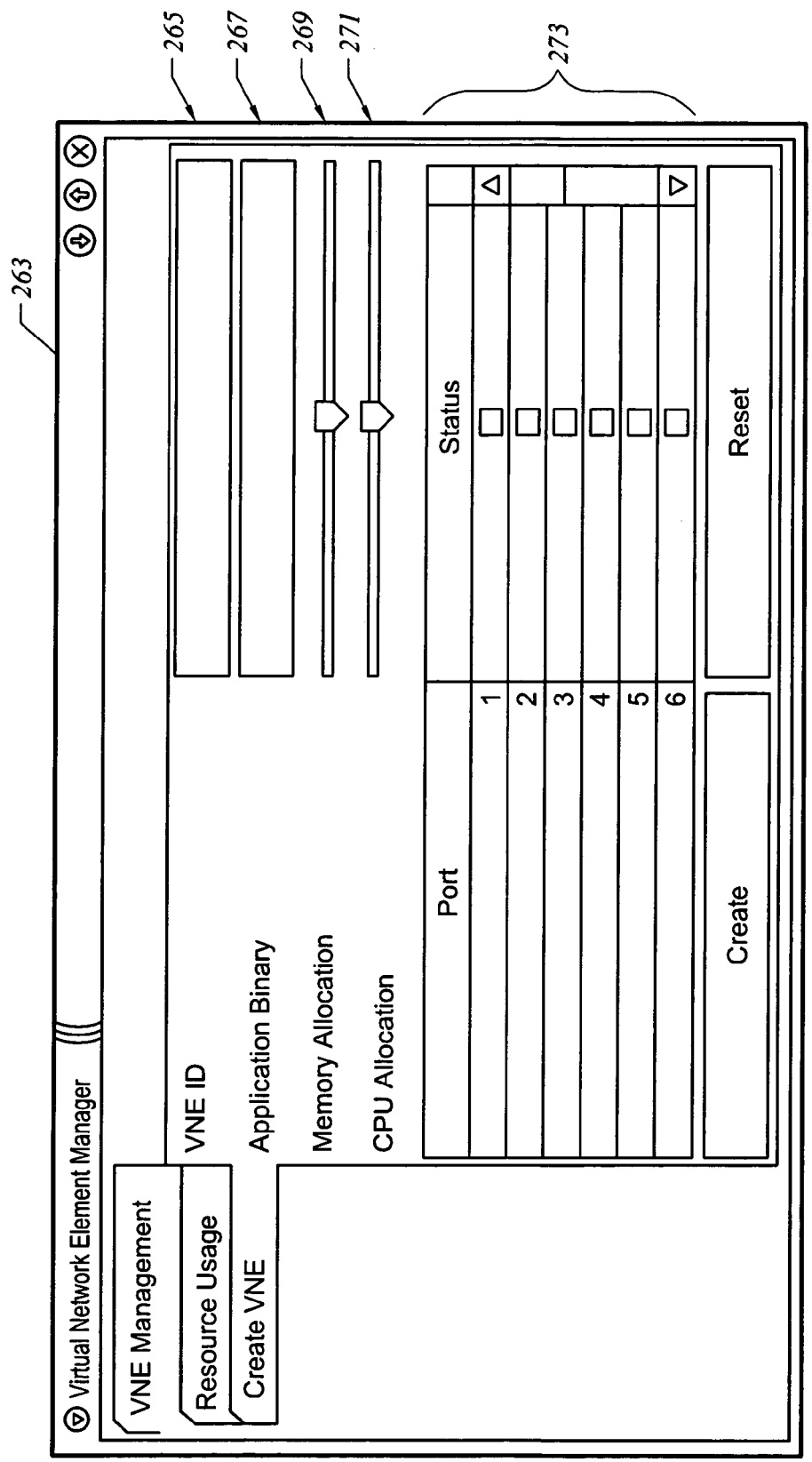

In FIG. 4B, the user has indicated that she wants to create a virtual network element. A graphical user interface window 263 is provided to initialize and allocate resources to the virtual network element. A text block 265 allows the user to specify the virtual network element ID. A text block 267 allows the user to specify the application binary for the virtual network element.

A slider 269 can be utilized to specify the memory to allocate to the virtual network element and a slider 271 can be utilized to specify the CPU time to allocate to the virtual network element. Scrolling area 273 can be utilized to allocate ports to the virtual network element.

Figure 4C:
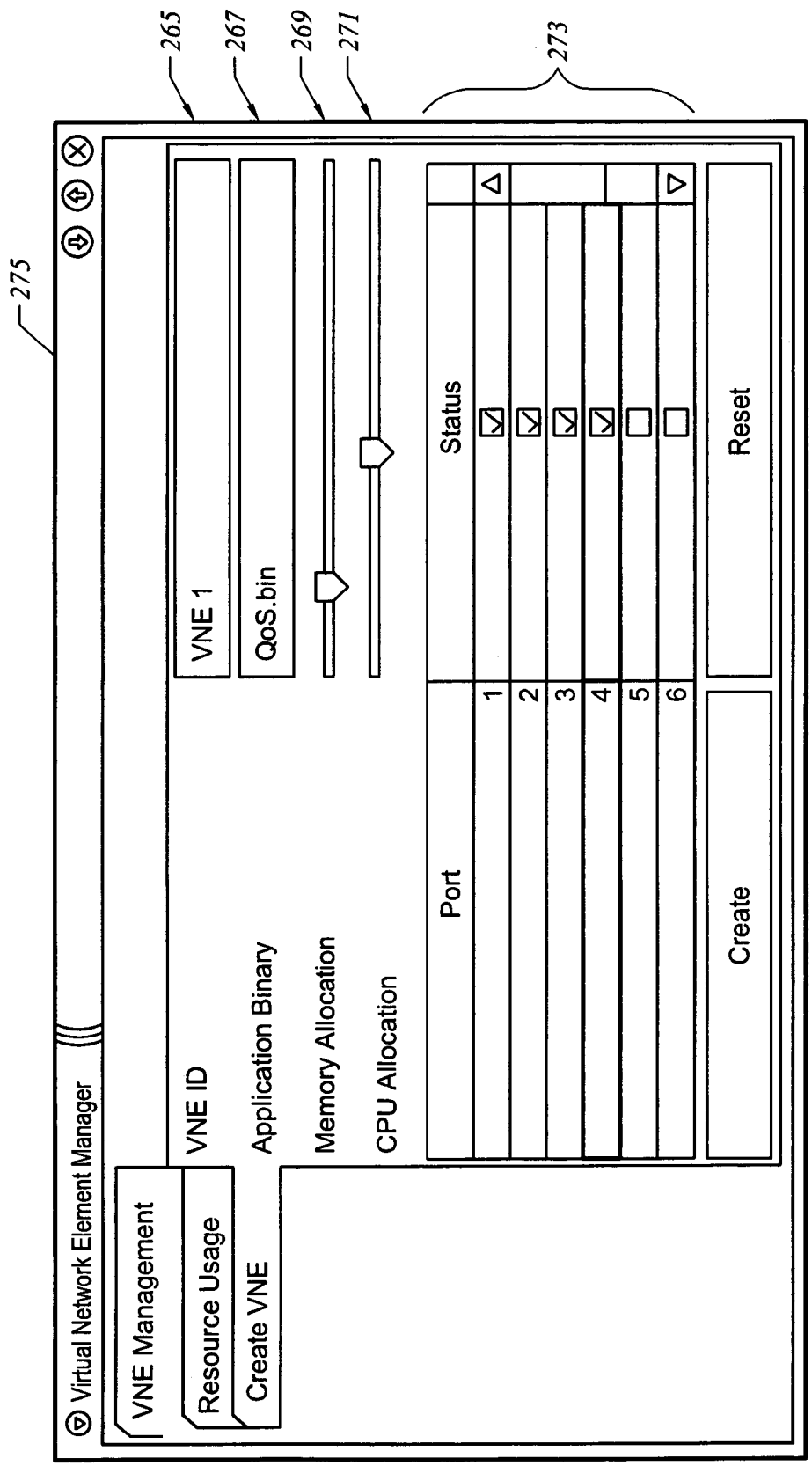

FIG. 4C is an example of FIG. 4B filled out by a user. As shown in a graphical user interface window 275, the user has specified the virtual network element ID as "VNE1" and the application binary is "QoS.bin." Sliders 269 and 271 specify the memory and CPU time to allocate to the virtual network element, respectively. These sliders specify the percentage of the network element's resources to allocate to the virtual network element. In some embodiments, the slider is prevented from moving to a position that would allocate more resources than are currently available. In other embodiments, the maximum amount of a resource is allocated if the slider specifies more than is currently available.

As shown, the user has utilized check boxes in scrolling area 273 to allocate ports 1–4 to the virtual network element. Once the user is satisfied with the entries in window 275, the user can create the virtual network element.

Figure 4D:
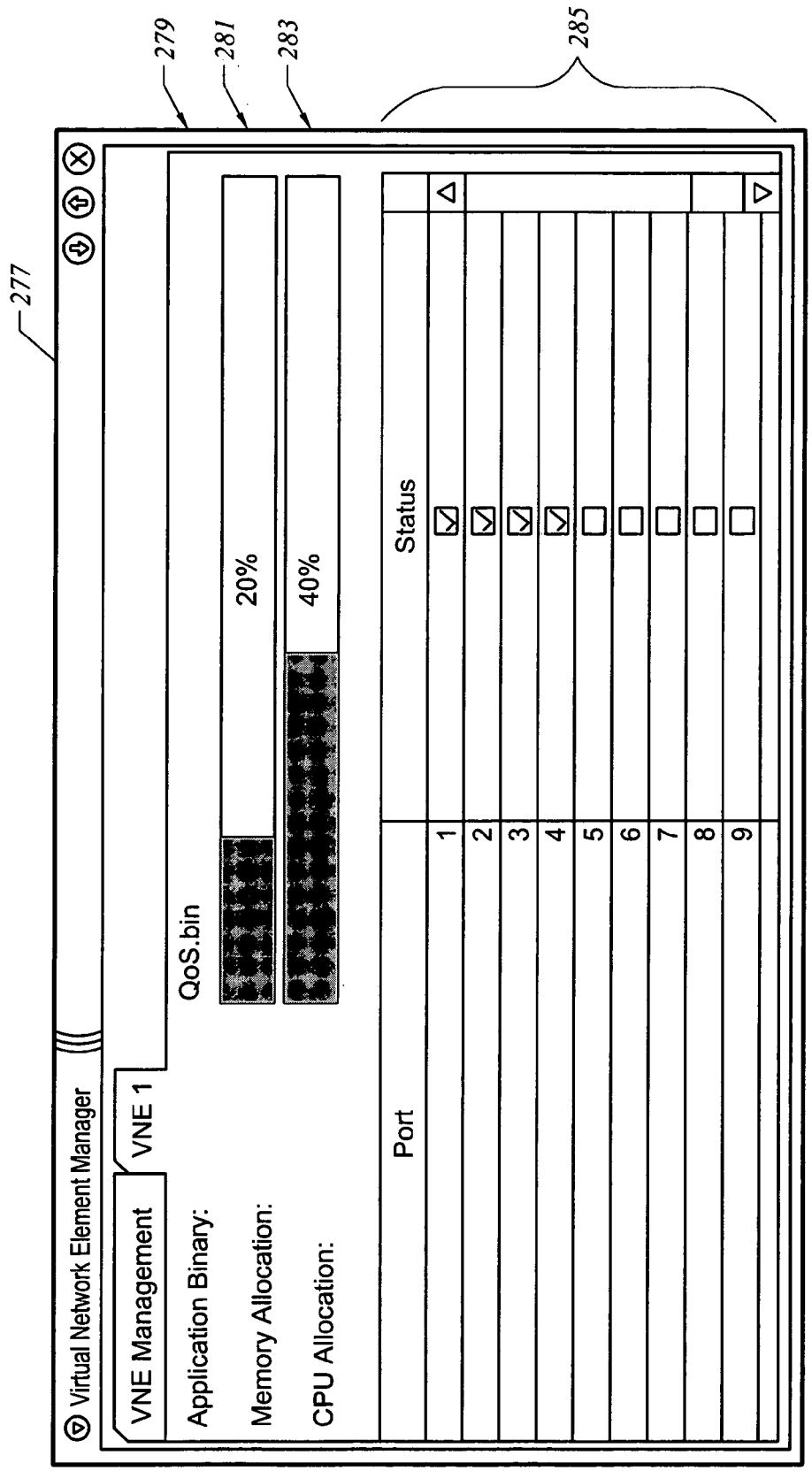

FIG. 4D shows the specifications for VNE1 that was created from FIG. 4C. As shown in a graphical user interface window 277, text 279 indicates the application binary is "QoS.bin," bar 281 indicates the virtual network element has 20% of the memory allocated to it and bar 283 indicates the virtual network element has 40% of the CPU time allocated to it. Scrolling area 285 indicates that the virtual network element has been allocated ports 1–4.

Figure 4E:
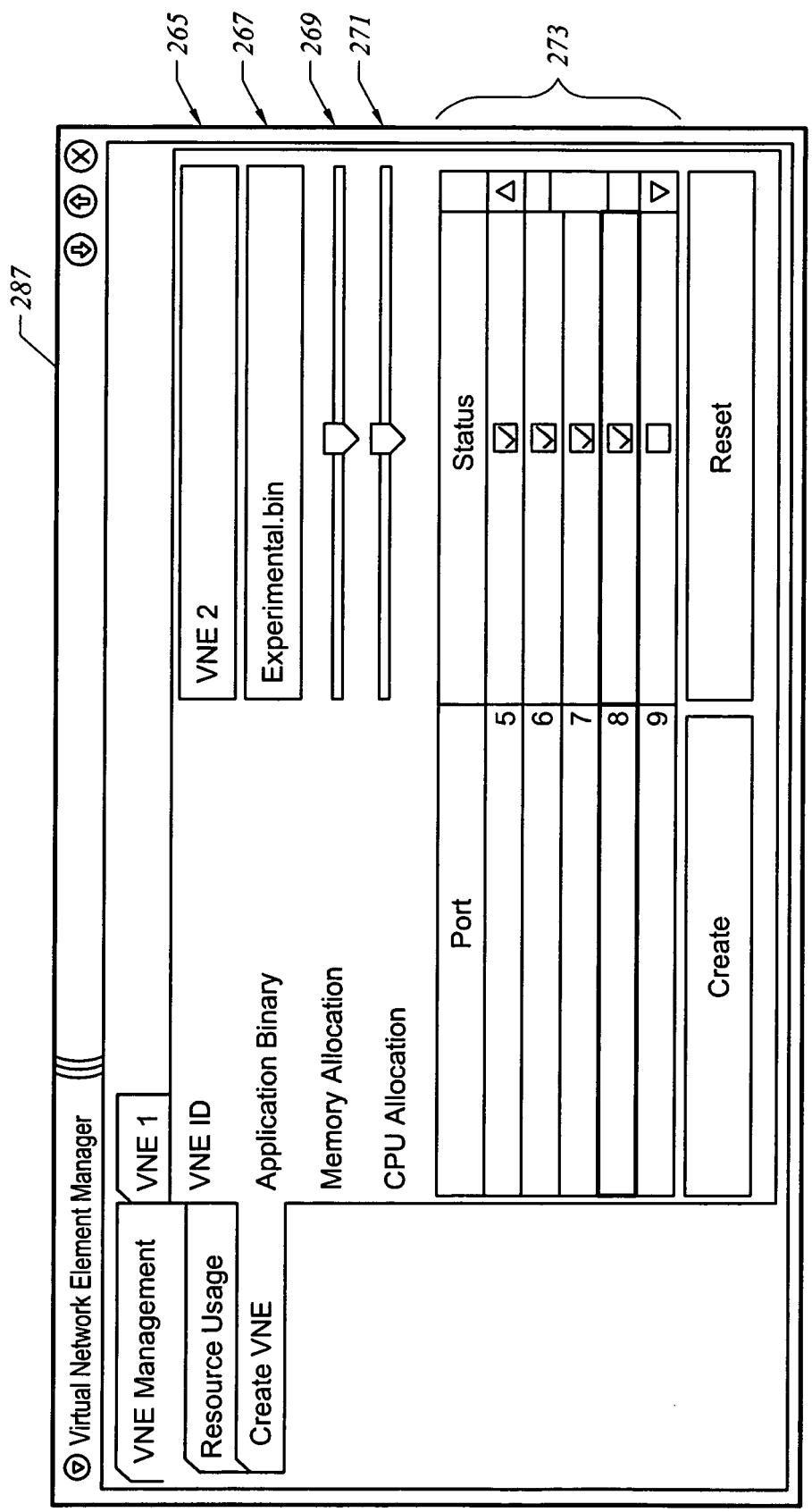

Now that one virtual network element has been created, the creation of a second virtual network element will be briefly described. FIG. 4E is an example of FIG. 4B filled out by a user for a second virtual network element. As shown in a graphical user interface window 287, the user has specified the virtual network element ID as "VNE2" and the application binary is "Experimental.bin." Sliders 269 and 271 specify the memory and CPU time to allocate to the virtual network element, respectively. As shown, the user has utilized check boxes in scrolling area 273 to allocate ports 5–8 to the virtual network element. Preferably, the check boxes for ports that are already allocated will not be able to be checked, thereby indicating that the port is unavailable at this time.

Figure 4F:
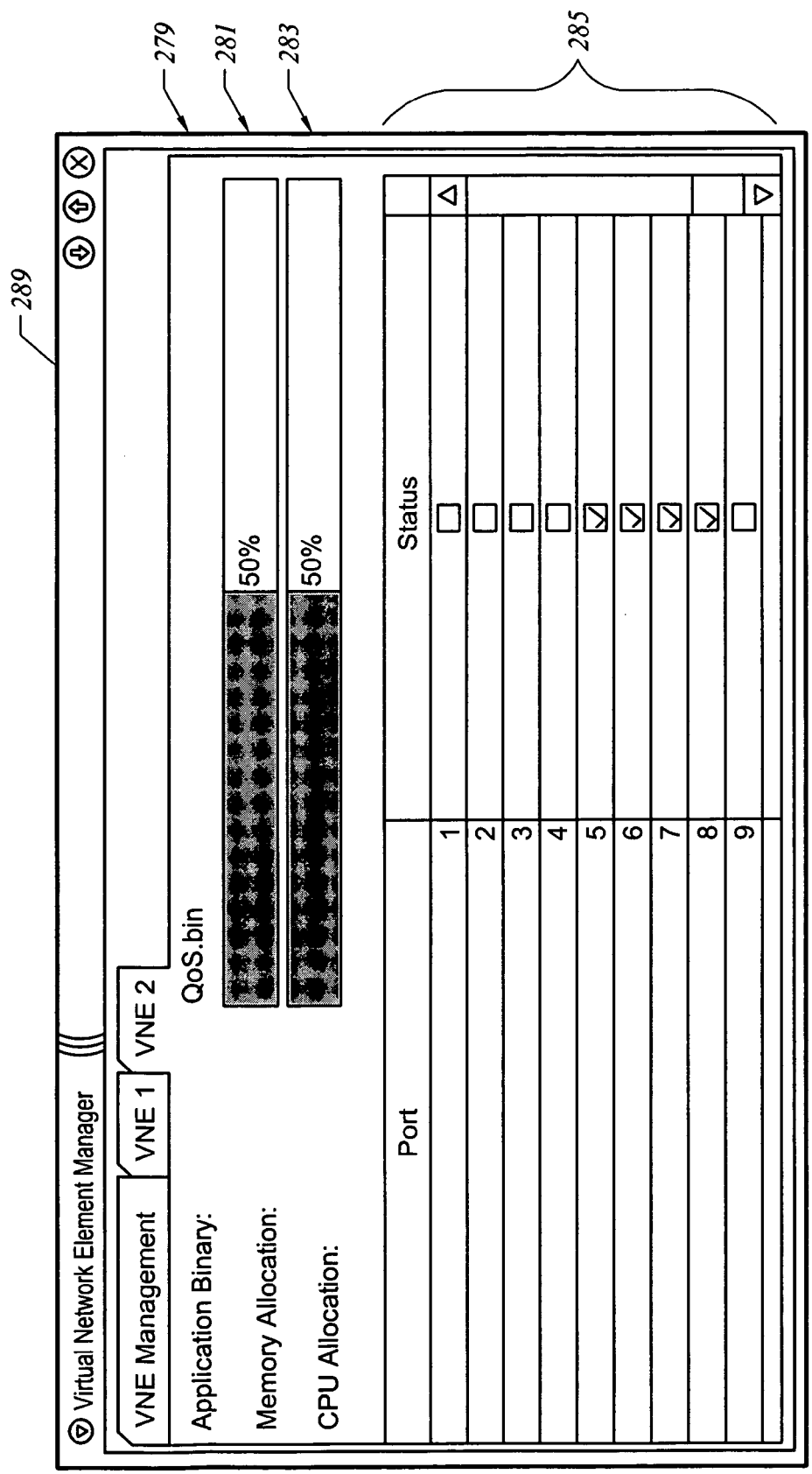

FIG. 4F shows the specifications for VNE2 that was created from FIG. 4E. As shown in a graphical user interface window 289, text 279 indicates the application binary is "Experimental.bin," bar 281 indicates the virtual network element has 50% of the memory allocated to it and bar 283 indicates the virtual network element has 50% of the CPU time allocated to it. Scrolling area 285 indicates that the virtual network element has been allocated ports 5–8.

Figure 4G:
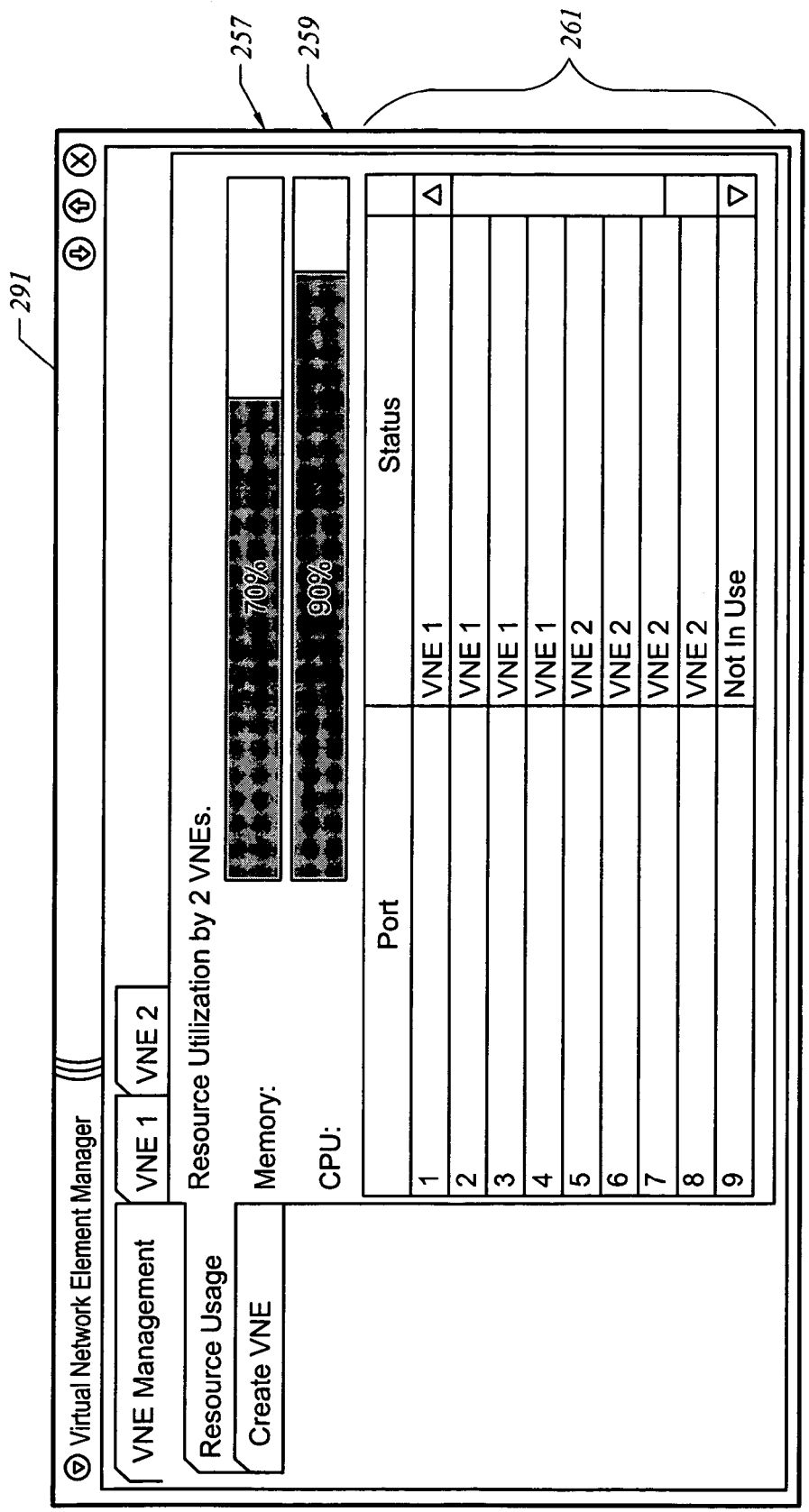

Returning full circle to the allocation of the resources of the network element, FIG. 4G (contrast this figure to FIG. 4A) shows that resources of the network element that have been allocated to the two virtual network elements. As shown, bar 257 indicates that 70% of the memory has been allocated and bar 259 indicates that 90% of the CPU time has been allocated. Scrolling area 261 indicates that ports 1–4 have been allocated to VNE1, ports 5–8 have been allocated to VNE2 and port 9 is not in use.

FIG. 5 shows a flowchart of a process of initializing a virtual network element. As with all the flowcharts shown herein, steps can be added, deleted, reordered and combined without departing from the spirit and scope of the invention.

At a step 301, a virtual network element ID is received. The virtual network element ID can be utilized to identify the virtual network element that is initialized. Input is received at a step 303 to indicate the virtual network element application to execute. The virtual network element application can be one of multiple binary executables that specify different levels of service (or resources).

At a step 305 input is received as to resources of the network element to allocate to the virtual network element that is initialized. Details of specifying the resources to be allocated to a virtual network element will be described in more detail in FIG. 6. The resources of the network element are allocated to the virtual network element at a step 307. The resources that are allocated are the resources that were specified in step 305. At a step 309, the virtual network element application that was specified in step 303 is executed.

Returning to step 305, FIG. 6 shows a flowchart of a process of specifying resources to be allocated to the virtual network element. At a step 351, input is received as to the portion of processor time of the network element to allocate to the virtual network element. In a similar manner, at a step 353, input is received as to the portion memory of the network element to allocate to the virtual network element. And, at a step 355, input is received as to the portion of ports of the network element to allocate to the virtual network element. As described above, the resources that are allocated to the virtual network element can include fewer or additional resources.

Once the virtual network element is initialized and executing, the virtual element manager is responsible for ensuring that the virtual network element does not utilize more resources than have been allocated to the virtual network element. Although there are many techniques that can be utilized to manage the resource utilization of the virtual network elements, the following paragraphs will describe techniques that can be utilized in some embodiments.

The processor time utilized by the virtual network elements can be managed using time slicing techniques. FIG. 7 shows a timeline 401 in which virtual network elements A, B and C utilize the processor over the timeline as shown. At each context switch 403, the virtual network element manager stores the state of the currently executing virtual network element and restores the state of a previously executing virtual network element. As shown, the length of time that a virtual network element can utilize the processor can vary according to the virtual network element. Alternatively, or in combination with the length of time allocated to each virtual network element, virtual network elements that are allocated more processor time can be switched in more often.

Because the time slicing of the virtual network elements is performed by the virtual network element manager, the virtual network element manager can ensure that the virtual network elements do not exceed their allocated portion of processor time to be utilized.

In order for the virtual network element manager to manage the memory resources that are allocated to each virtual network element, the virtual network element manager can receive memory allocation requests from the virtual network elements. For example, in the C programming language, this memory allocation request can be in the form of a function call called malloc( ). FIG. 8 shows a flowchart of a process of processing a memory allocation request. At a step 451, it is determined if memory is available to satisfy the memory allocation request. If memory is unavailable, a failure code is returned at a step 453. Otherwise, it is determined if the virtual network element has sufficient memory allocated to fulfill the request. If not, a failure code is returned at step 453. In some embodiments, the failure code that is returned can indicate to the virtual network element whether the failure was a result of the network element not having enough memory available in which case the virtual network element can attempt to receive more memory at a subsequent time or whether the virtual network element does not have sufficient memory allocated to it to fulfill the request.

At a step 457, the memory that was requested in the memory allocation request is obtained. The virtual network element status is updated to indicate the additional memory at a step 459. At a step 461, a pointer to the allocated memory block is returned to the virtual network element.

Since the virtual network element manager processes the memory allocation request, the virtual network element manager can ensure that the virtual network elements do not utilize more than their fair share of memory that has been allocated to them.

A mechanism through which the virtual network elements send and receive data through the ports can vary. For example, each virtual network can have access to all the addresses of the ports of the network element and it is a responsibility of the virtual network element manager to ensure that the virtual network elements do not send or receive data through ports to which they are not allocated. As another example, each virtual network element may only have the addresses for the ports to which they have been allocated. FIG. 9 shows a flowchart of a process of maintaining the available ports for a virtual network element according to the later methodology.

At a step 501, the virtual network element periodically queries the virtual network element manager for available ports. The ports that are available for the virtual network element are received at a step 503. At a step 505, a virtual network element updates the available ports and can use these available ports.

By having the virtual network element query the virtual network element manager for available ports, the virtual network element manager can ensure that the virtual network elements use only those ports to which they were allocated.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A method of partitioning a network element into a plurality of virtual network elements, comprising:
   providing a virtual network element manager that manages resources of the network element, wherein managing resources comprises:
      managing processor time utilizing time slicing at the virtual network element manager;
      managing memory, wherein the virtual network element manager receives memory allocation requests from said plurality of virtual network elements; and
      managing ports, wherein the virtual network element manager receives queries from said plurality of virtual network elements for ports available for the virtual network element sending the query;
   allocating a portion of the resources of the network element to one of the plurality of virtual network elements;
   permitting the one of the plurality of virtual network elements to utilize only the portion of the resources of the network element that has been allocated to the one of the plurality of virtual network elements; and
   reallocating a portion of the resources of the network element allocated to one of the virtual network elements to another one of the virtual network elements.

2. The method of claim 1, wherein the network element transmits data in a network.

3. The method of claim 2, wherein the network element is a switch.

4. The method of claim 1 wherein allocating a portion of the resources comprises receiving user input defining the portion of resources to allocate to each of said plurality of virtual network elements.

5. The method of claim 4 further comprising providing an indication of percentage of memory and processor time that is allocated to said plurality of virtual network elements.

6. The method of claim 1 wherein at least two of said plurality of virtual network elements correspond to different levels of service.

7. The method of claim 1 further comprising indicating if the virtual network element has insufficient memory to fulfill an allocation request or if the virtual network element requesting said memory has insufficient memory allocated thereto.

8. The method of claim 1 wherein the network element comprises a single processor.

9. A network element partitioned into a plurality of virtual network elements, the network element comprising:
   resources comprising processor time of a single processor, memory, bandwidth, and a plurality of ports; and
   a virtual network element manager that manages the resources of the network element, the virtual network element manager configured to allocate and reallocate the resources between said plurality of virtual network elements, receive memory allocation requests for managing memory, receive queries from the virtual network elements for ports available for the virtual element sending the query, and manage ports;
   wherein each of said plurality of virtual network elements is permitted to utilize only the portion of the resources of the network element that has been allocated or reallocated to the virtual network element.

10. The network element of claim 9, wherein the network element transmits data in a network.

11. The network element of claim 10, wherein the network element is a switch.

12. A network element, comprising:
   resources comprising processor time, memory, bandwidth, and ports;
   a means for managing resources of the network element, said managing means configured to allocate and reallocate said resources between said plurality of virtual network elements and comprising;
      means for managing processor time;
      means for receiving memory allocation requests from said plurality of virtual network elements for managing memory; and
      means for managing ports comprising means for receiving queries from said plurality of network elements for ports available for the virtual network element sending the query; and
   a means for utilizing a portion of the resource of the network element, wherein the means for utilizing is permitted to utilize only the portion of the resource of the network element.

13. The network element of claim 12, wherein the network element transmits data in a network.

14. The network element of claim 13, wherein the network element is a switch.

15. A method of partitioning a network element that transmits data in a network into a plurality of virtual network elements, comprising:
   providing an indication of percentage of memory and processor time that is allocated or available to said plurality of virtual network elements;
   receiving input as to a portion of at least one resource of the network element to allocate to one of the plurality of virtual network elements, wherein the at least one resource of the network element is processor time, memory, or ports;
   allocating the portion of the network element to the one of the plurality of virtual network elements;
   receiving input specifying an application binary for the virtual network element;
   executing the application binary for the virtual network element;
   receiving a query from at least one of said virtual network elements for ports available for the virtual network element sending the query;
   permitting the one of the plurality of virtual network elements to utilize only the portion of the at least one resource of the network element that has been allocated to the one of the plurality of virtual network elements; and
   reallocating a portion of the resources of the network element allocated to one of the virtual network elements to another one of the virtual network elements.

16. The method of claim 15, wherein receiving input as to a portion of at least one resource includes:
   receiving input as to a portion of processor time of the network element to allocate to one of the plurality of virtual network elements;
   receiving input as to a portion of memory of the network element to allocate to one of the plurality of virtual network elements; and
   receiving input as to a portion of ports of the network element to allocate to one of the plurality of virtual network elements.

17. The method of claim 16, wherein the network element transmits data in a network.

18. The method of claim 17, wherein the network element is a switch.

* * * * *